(12) United States Patent
Birnhak

(10) Patent No.: US 6,400,813 B1
(45) Date of Patent: Jun. 4, 2002

(54) MEDIATION SYSTEM FOR A TELEPHONE NETWORK

(75) Inventor: Gary S. Birnhak, Mount Laurel, NJ (US)

(73) Assignee: Inrange Technologies, Inc., Lumberton, NJ (US)

( * ) Notice: Subject to any disclaimer, the term of this patent is extended or adjusted under 35 U.S.C. 154(b) by 0 days.

(21) Appl. No.: 09/426,272

(22) Filed: Oct. 25, 1999

(51) Int. Cl.$^7$ .................. H04M 1/24; H04M 15/00; H04M 7/00
(52) U.S. Cl. ............... 379/133; 379/32.02; 379/126; 379/230; 370/244; 370/251
(58) Field of Search ................. 379/1, 34, 112, 379/113, 114, 115, 117, 118, 132, 133, 207, 229, 230; 370/241, 244, 247, 248, 250, 251

(56) References Cited

U.S. PATENT DOCUMENTS

| | | | |
|---|---|---|---|
| 4,756,020 A | | 7/1988 | Fodale ..................... 379/112 |
| 5,008,929 A | | 4/1991 | Olsen et al. ............... 379/112 |
| 5,438,570 A | | 8/1995 | Karras et al. ............. 370/94.2 |
| 5,475,732 A | * | 12/1995 | Pester, III ................. 379/34 |
| 5,579,371 A | * | 11/1996 | Aridas et al. ............... 379/34 |
| 5,592,530 A | * | 1/1997 | Brockman et al. ........... 379/34 |
| 5,712,908 A | | 1/1998 | Brinkman ................. 379/119 |
| 5,757,895 A | * | 5/1998 | Aridas et al. .............. 379/136 |
| 5,802,145 A | * | 9/1998 | Farris et al. ................ 379/34 |
| 5,881,132 A | * | 3/1999 | O'Brien et al. .............. 379/35 |
| 5,892,812 A | * | 4/1999 | Pester, III ................. 379/34 |
| 6,111,946 A | * | 8/2000 | O'Brien .................... 379/230 |
| 6,249,572 B1 | * | 6/2001 | Brockman et al. .......... 379/133 |

FOREIGN PATENT DOCUMENTS

WO    WO 96 16517    5/1996    ............ H04Q/3/00

* cited by examiner

*Primary Examiner*—Binh Tieu
(74) *Attorney, Agent, or Firm*—Baker & Hostetler LLP

(57) ABSTRACT

A mediation system for a telephone network. The telephone network includes a plurality of signaling service points (SSPs) communicating message signaling unit (MSU) data with a plurality of signal transfer points (STPs). The MSU data is routed on data links connecting the plurality of SSPs and STPs. The mediation system includes a probe and a mediator. The probe is connected to at least one of the data links for intercepting the MSU data routed on the one data link, and the mediator is coupled to the probe for collecting the MSU data generating a call detail record (CDR). The probe intercepts either A-link data and/or E-link data on the data links. The mediator correlates the MSU data against a call list and generates either a full CDR or a partial CDR depending on a mode selected by a user of the system.

2 Claims, 6 Drawing Sheets

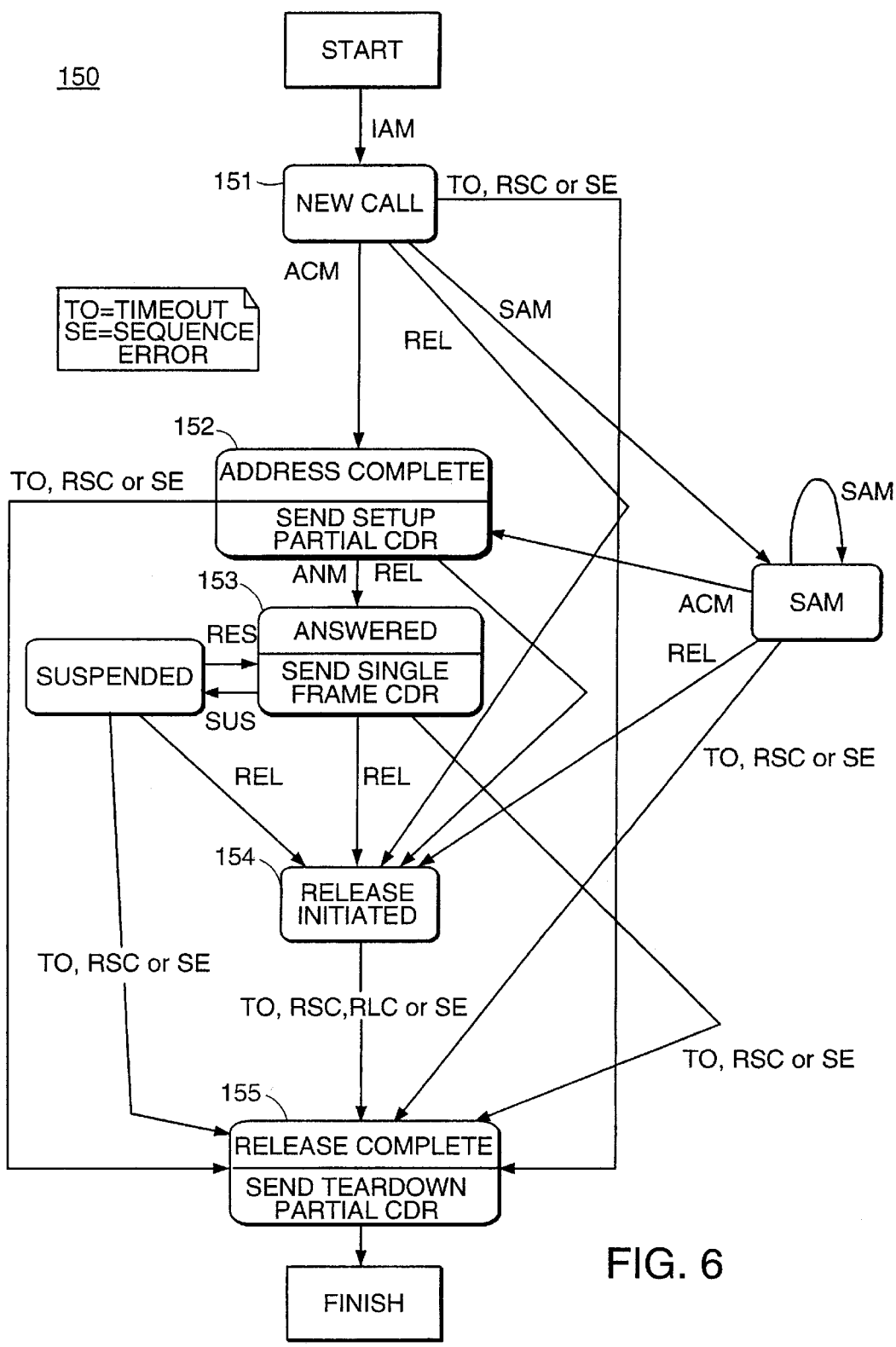

MEDIATION SYSTEM FOR A TELEPHONE NETWORK

TECHNICAL FIELD

The present invention relates, in general, to telephone networks and, more specifically, to a system that passively monitors telephone services and traffic in a telephone network and reports the same to a user.

BACKGROUND OF THE INVENTION

Modern telephone networks require a signaling system for management of a variety of call setup and control functions, such as call routing and billing. One version of a signaling system is a Common Channel Signaling System No. 7, referred to as SS7. The SS7 follows an international standard defined by the International Telecommunications Union (ITU), and its variants such as those defined by the American National Standards Institute (ANSI) and Bell Communications Research (Bellcore).

The telephone network typically includes a plurality of offices through which telephone calls may be routed, each office being owned by a telephone company that participates in the network. The telephone company may be a Regional Bell Operating Company (RBOC) of an Independent Telephone Company (ITC), for example. Each office includes a signaling service point (SSP) for formulating a message signaling unit (MSU). An MSU may include a request for data pertinent to a particular call or a message for setting up a call. In the terminology used in the SS7 system, these offices are referred to as having SP (signaling point) capability.

Within each RBOC or ITC, the SS7 includes one or more signal transfer points (STPs). Each STP is essentially a specialized packet switch for receiving and transmitting digital data using packet switch technology. Each office with a SSP is coupled to an STP. Typically, several SSPs may be coupled to a single STP. In addition, communications between different telephone companies may be between their respective STPs.

In an SS7 system, an SSP may be coupled to an STP by way of a digital link, referred to as an A-link. Furthermore, an STP may be coupled to another STP by way of a different digital link, referred to as a B-link. A B-link typically includes a data transfer rate of 56 kbps.

A conventional telephone network, designated 10, is shown in FIG. 1. As shown, ITC 12 and ITC 14, respectively including SSP 24 and SSP 26 are coupled via A-links to a hub-STP 20. RBOC 16 and RBOC 18, respectively including STP 28 and STP 30 are coupled to hub-STP 20 via B-links. In the network shown, STP 20 is referred to as a hub-STP, because of its central position in the network architecture. The primary function of hub-STP 20 is to route SS7 messages from one SSP to another, for example, between SSP 24 and SSP 26 or between STP 28 and STP 30.

These messages, termed MSUs, include queries, responses to queries, and trunk signaling messages. By way of example, an MSU may be a message requesting information as to whether a credit card number was valid. A response may be the requested validation information. A trunk signaling message may be a message to set up a voice circuit in the existing network. Each time that an MSU is received by hub-STP 20, a copy of the MSU is also received by billing system 22. The received MSU data is processed by the billing system to produce invoices, bills and reports, as further described in U.S. Pat. No. 5,008,929 issued Apr. 16, 1991 to Olsen et al.

Additional description of the SS7 system and various MSU types is provided in U.S. Pat. No. 5,008,929, which is incorporated herein by reference.

In the network shown in FIG. 1, billing system 22 monitors MSU messages received from hub-STP 20. Billing system 22 depends on hub-STP 20 to reformat the MSU messages from the other SSPs and STPs and then transmit the messages to the billing system. Reconstructing the messages as they appear across multiple links in a typical SS7 distributed network is laborious and time consuming.

Billing system 22 processes the MSUs to produce usage data that indicates service recipients and service providers. The service recipient is the telephone company that own the SSP that formulated the MSU, and the service provider is the telephone company that provided the call data for the MSU, or that transported the MSU. The usage data may then be used to produce invoice data for assigning costs among the telephone companies. Independent verification of the accuracy of the usage data and assigned costs by a telephone company is also laborious and time consuming.

The deficiency of the conventional system to consolidate and correlate data across multiple links of a typical distributed SS7 network show that a need still exists for an improved system. In addition, a need exists for an independent system to verify the reliability and accuracy of usage data provided by a conventional system, such as billing system 22.

SUMMARY OF THE INVENTION

To meet this and other needs, and in view of its purposes, the present invention provides a mediation system for a telephone network. One embodiment, includes a telephone network having a plurality of signaling service points (SSPs) communicating message signaling unit (MSU) data with a plurality of signal transfer points (STPs). The MSU data is routed on data links connecting the plurality of SSPs and STPs. The mediation system includes a probe and a mediator. The probe is connected to at least one of the data links for intercepting the MSU data routed on the one data link, and the mediator is coupled to the probe for collecting the MSU data and generating a call detail record (CDR). In another embodiment, the probe is connected to a plurality of data links, wherein the plurality of data links route MSU data to one of the STPs. The probe intercepts either A-link data and/or E-link data on the data links. The probe includes a filter for filtering MSU data. In another embodiment, the mediator includes a correlator for sorting the MSU data into queues, each of the queues store MSU data from a single data link. The correlator includes a data router for routing MSU data from a data link to a predetermined queue.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 6 is a state diagram depicting the generation of several partial CDRs in the mediator in accordance with the present invention.

DETAILED DESCRIPTION OF THE INVENTION

Figure 1:
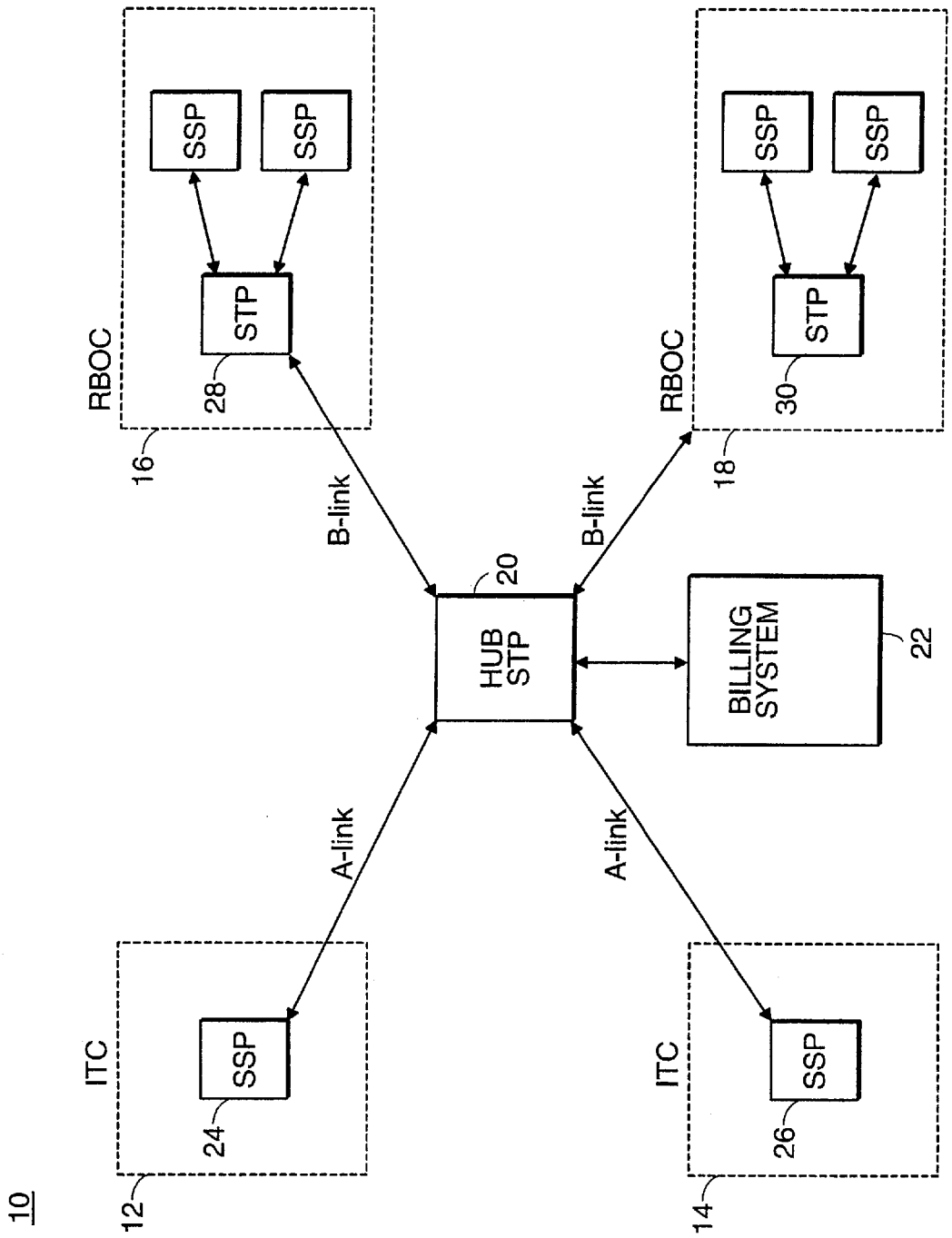
FIG. 1 is a schematic diagram of a conventional telephone networking.
Figure 2:
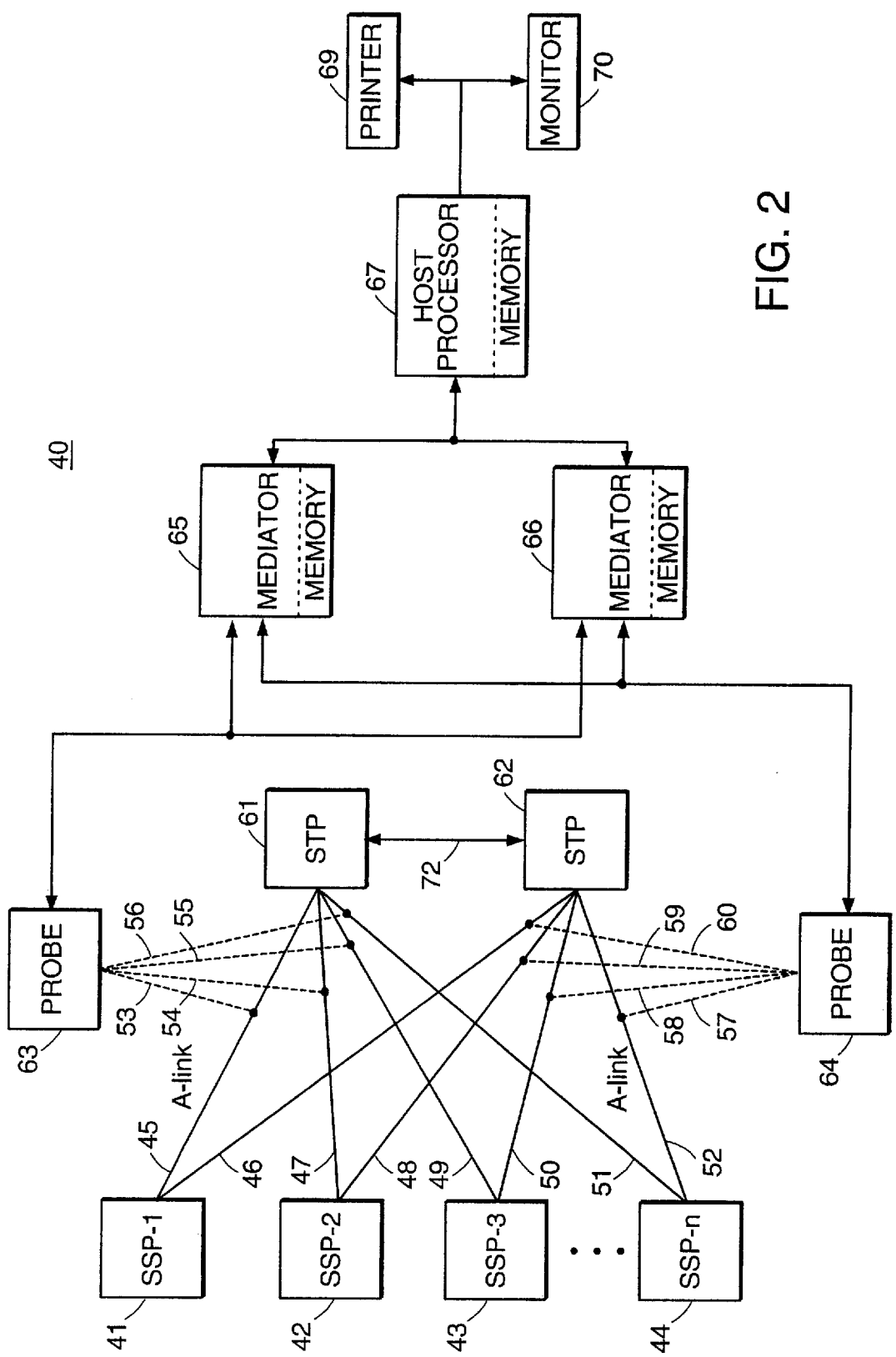
FIG. 2 is a schematic diagram of a mediation system of the present invention coupled to a telephone network.

Referring to FIG. 2 the invention will now be described. A plurality of SSPs, generally designated as 41–44, and STP 61 and STP 62 are interconnected, as shown in telephone network 40. The SSPs communicate with the STPs over A-links 45–52. STP 61 communicates with STP 62 over another link 72. It will be appreciated that the SSPs and the STPs may each be located in a different region or locality.

In a typical arrangement, each SSP may be paired with two STPs. For example, SSP-1 is shown paired with STP 61 and STP 62. Pairing with STPs provides redundancy and achieves better load balancing of call traffic. Although FIG. 2 shows that each SSP communicates with an STP over an A-link, it will be appreciated that an SSP may also communicate with an STP over a different type of link, generally known as an E-link. Furthermore, each link, for example links 45–52, may be a set of links for redundancy and load balancing purposes. Thus, A-link 45 may be a set of 16 individual A-links coupled to STP 61. Although not shown, STP 61 and STP 62 may each be a combined node, which provides both functions of an SSP and an STP. SSP's 41–44 may also be combined nodes.

Also shown is probe 63 coupled to each A-link connected to STP 61. As four A-links are shown connected to STP 61, probe 63 may be connected by way of links 53–56 to respective A-links 45, 47, 49 and 51. Similarly, probe 64 may be coupled to each A-link connected to STP 62. Accordingly, probe 64 may be connected by way of links 57–60 to respective A-links 52, 50, 48 and 46. It will be appreciated that probe 63 may be physically located near STP 61 and probe 64 may be near STP 62. As will be explained in greater detail below, each probe collects MSUs carrying call information on each A-link coupled to an STP, or each E-link coupled to an STP.

Still referring to FIG. 2, mediator 65 is coupled to probes 63 and 64, while mediator 66 is also coupled to probes 63 and 64. Each mediator collects the MSUs from the probes, correlates the MSUs into calls and generates call detail records (CDRs). The CDRs may be sent to host processor 67. Host processor 67 may further process the CDRs using billing verification and fraud detection algorithms. The processed data may be stored in memory, displayed on monitor 70, or formatted into a report by printer 69.

Each mediator instructs a probe to collect MSUs from specific SS7 links. For example, mediator 65 may instruct probe 63 to collect MSUs on A-link 45 and A-link 47 and instruct probe 64 to collect MSUs on A-link 46 and 48. The probes then collect the MSUs. The MSUs received by the probe are in SS7 format, i.e., the data is binary and in a variable length format. The MSUs include IAM (initial address), SAM (subsequent address), ACM (address complete), ANM (answer), SUS (suspend), RES (resume), REL (release), RLC (release complete), CON (connect) and RSC (reset circuit). Each link on the probe may be configured to have an address of a mediator that indicates where to send the messages. The probe may send the messages directly to the mediator associated with the configured is mediator address (the destination).

In the preferred embodiment each probe may also filter the MSUs and send filtered data to the mediator. The format of raw SS7 messages on the SS7 links and techniques for extracting data therefrom are well known to those skilled in the art. A general description of the SS7 messages may be found in U.S. Pat. No. 5,008,929 and is incorporated herein for its teachings.

The probe may, for example, extract (or filter) destination and origination point codes from the SS7 messages. The probe may also extract (or filter) all MSU data required for pricing and billing information.

The filtered messages are transmitted by the probe and received by the mediator. As the mediator may receive messages from a plurality of probes, the messages are correlated by call, so that all SS7 messages pertaining to a call may be identified. Once identified and collected, the mediator may generate a complete call detail record (CDR) for the call.

In the preferred embodiment, all SS7 messages from/to an SSP are directed to the same mediator. If the SS7 messages from/to an SSP are not directed to the same mediator, but are received by multiple mediators, there is a possibility that some messages may not be correlated, or may need to be correlated at a higher level with some loss of scalability.

All messages of calls originating from and terminating at a particular SSP may be sent directly to a single mediator by monitoring all A-links connected to that SSP. For example, mediator 65 may be set up to receive all A-link messages from SSP 41 by way of probes 63 and 64. By sending all messages for a call to one mediator, the mediator has a high probability of correlating the messages. In one embodiment of the invention, messages that are not correlated are sent to the host processor for correlation. In another embodiment, messages not correlated may be discarded.

It will be appreciated that the signaling link code (SLC) between two signaling points, for example SSP 41 and STP 61, is a 4-bit code. The 4-bit code allows for a maximum of 16 links in a link set. In the exemplary embodiment shown in FIG. 2, STP 61 and STP 62 may be considered a mated STP pair. Accordingly, any SSP may have up to 32 links with any mated STP pair. For example, SSP 41 may have up to 16 links to STP 61 and another 16 links to STP 62.

Each mediator normalizes the data received from the probes into partial or full CDRs. Messages of different protocols are normalized into a common record format. The normalized record is then correlated into full CDRs or partial CDRs containing the information for a call. There is a one-to-one relationship between the SS7 messages and the normalized records.

Figure 3:
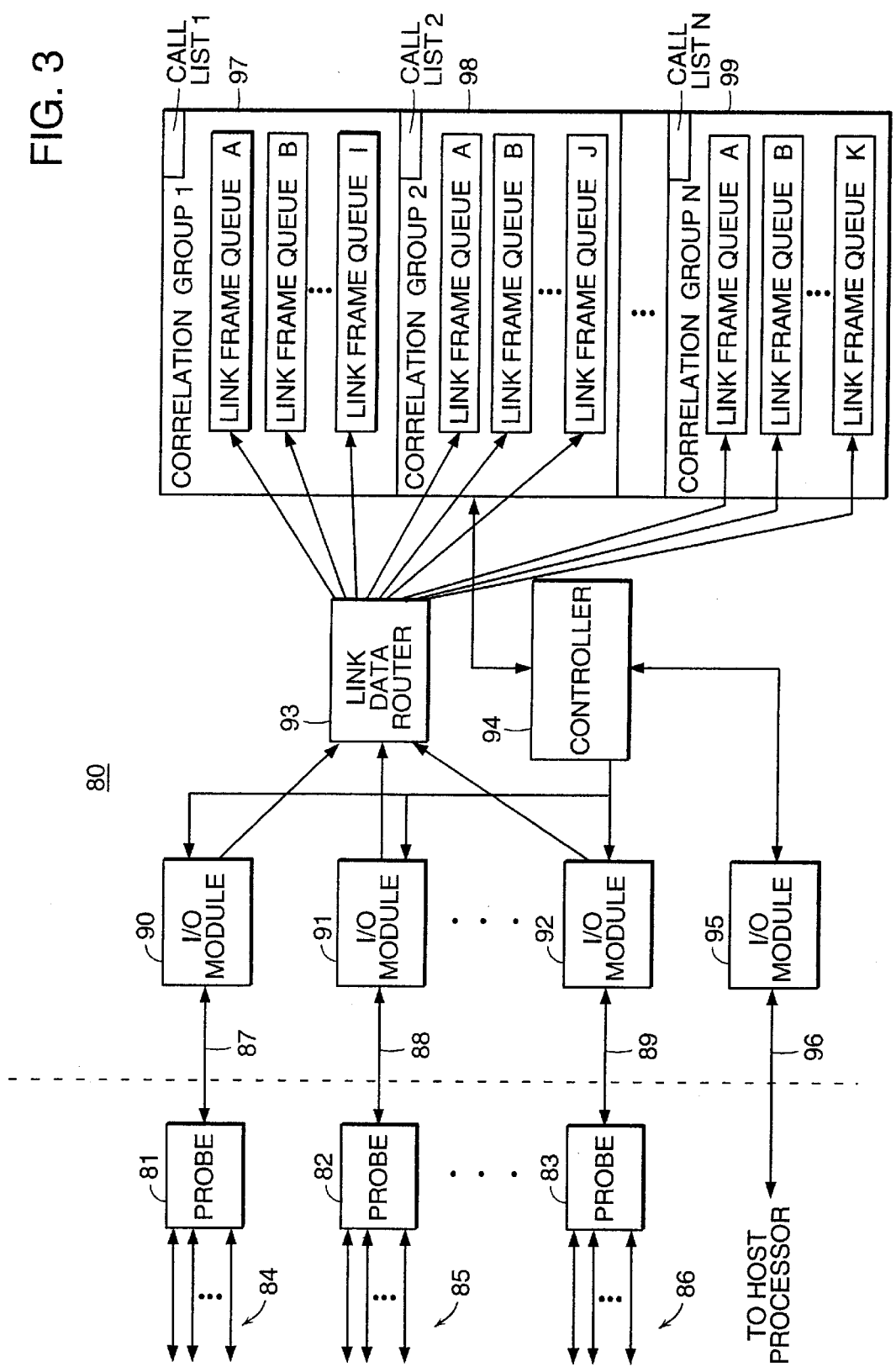
FIG. 3 is a schematic diagram of a mediator coupled to a probe in accordance with the present invention.

Referring next to FIG. 3, one embodiment of a mediator, generally designated as 80, will now be described. As shown, a plurality of I/O modules 90–92 are coupled to respective data links 87–89. I/O modules 90–92 may be, for example, conventional Ethernet (10/100 Base T Ethernet) connections using a protocol such as TCP/IP that allows high speed communications with probes 81–83. Another TCP/IP connection may also be formed by way of I/O module 95 between a host processor and controller 94, as shown.

In operation, controller 94 waits for a connection request from the host processor (for example processor 67) using TCP/IP protocol. When connected, host processor 67 sends configuration commands to controller 94 specifying which probes are to collect SS7 messages over specific links. Controller 94 then makes the TCP/IP connections to the probes. For example, FIG. 3 shows mediator 80 connected to probes 81–83. Controller 94 reformats the configuration commands from host processor 67 into compatible probe commands. The probe commands specify the SS7 messages desired to be collected from specific links. For example, probe 81 may be commanded to collect and filter MSUs carrying call information from a single or a plurality of links 84. Similarly, probes 82 and 83 may be commanded to collect and filter MSUs from a plurality of links 85 and a plurality of links 86, respectively.

The controller, by way of a software module, creates correlation groups, designated generally as 97, 98 and 99. Each correlation group includes several link frame queues to hold SS7 frames. One link frame queue holds frames from a single SS7 link. For example, correlation group 1 holds an I-number of link frame queues, which may be frames from the set of I links 84 obtained by probe 81. In another example, correlation group 2 may hold a J-number of link frame queues from the set of J links 84 and 85 obtained by probes 81 and 82. In yet another example, correlation group N may hold a K-number of link frame queues from the set of K links 84, 85 and 86 obtained by probes 81, 82 and 83.

Link data router 93 routes link frames to their correct link frame queue. When a call completes, or times out, a correlation group, for example correlation group 97, generates a CDR for the call and sends the CDR to host processor 67 by way of I/O module 95. As link data is correlated by the correlation group, the link data is checked for fields denoting that a conversation, for example, is occurring. For example, to correlate ISUP messages into calls, point codes and trunk circuit ID fields may be used. The link data is also timestamped, an important part of completing a CDR.

It will be appreciated that different mediators may be configured to collect and correlate link data from the same probe, but not from the same link. This is illustrated, for example, in FIG. 2 which shows mediators 65 and 66 configured to collect and correlate data from probe 63. In the preferred embodiment, however, mediator 65 may be configured to collect data, for example, from A-link 45 and A-link 46, whereas mediator 66 may be configured to collect data from A-link 49 and A-link 50. Since any probe link may be assigned to any mediator for correlation, the invention provides a mediation system that is flexible and scalable.

Figure 4:
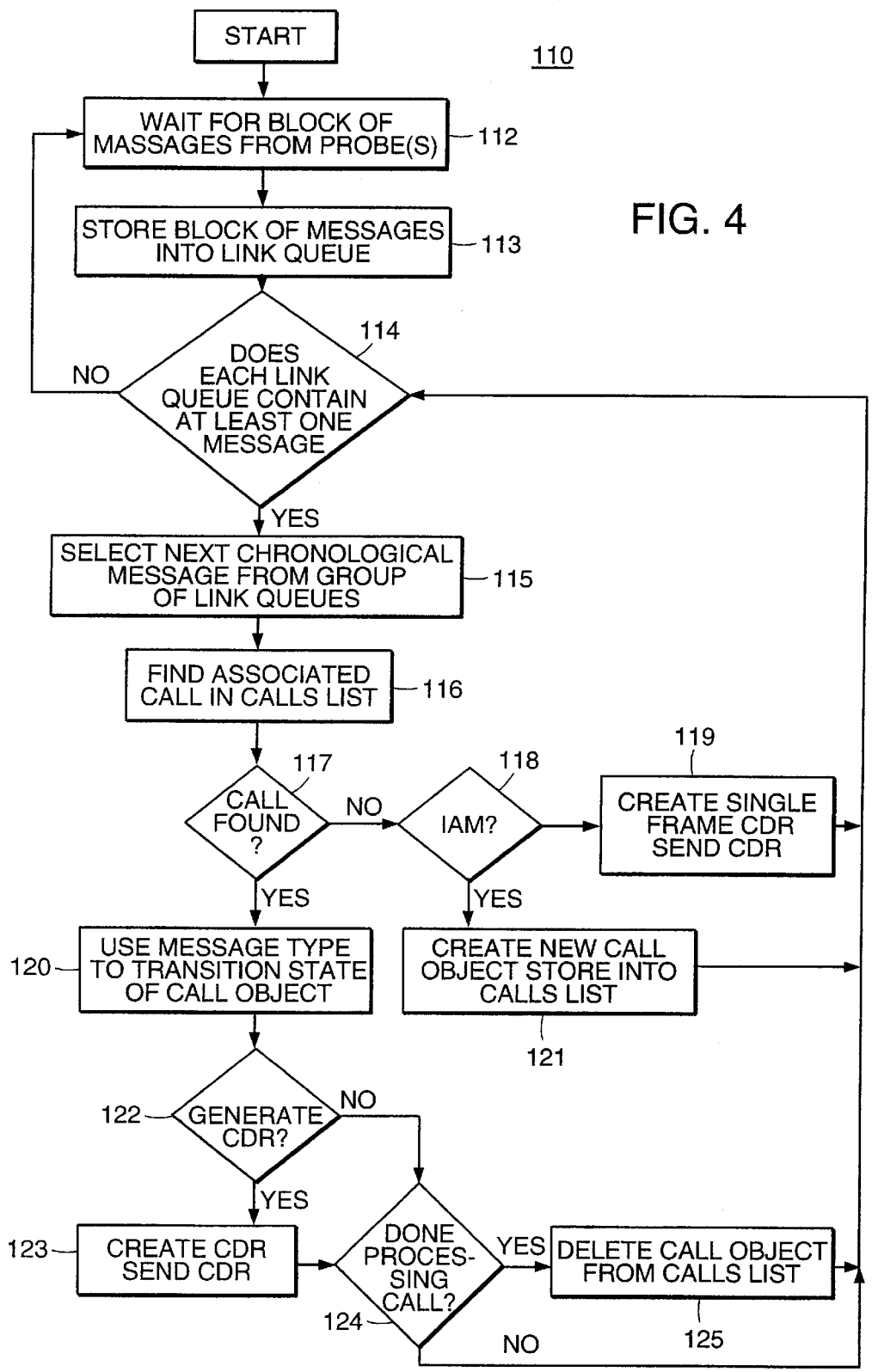
FIG. 4 is a flow chart showing correlation processing steps in the mediator in accordance with the present invention.

The processing performed in each correlation group, for example correlation group 1 (97) or correlation group 2 (98), will now be described in greater detail by reference to FIG. 4. The correlator processing steps are generally designated by 110, as shown. The correlator waits for blocks of messages from the probes in step 112. When a block of SS7 messages is received, the block of messages are stored in step 113 in a link frame queue, for example, link frame queue A (shown in FIG. 3). It will be appreciated that each block of SS7 messages is from a single link. Another block of messages from a different link, when received, is stored in another link frame queue. A call list is also maintained in each correlation group, for example, call list 1 in correlation group 1 and call list 2 in correlation group 2 (FIG. 3).

After a block of messages is received, decision block 114 is performed. If each link queue in the correlation group contains at least one message, then step 115 selects the next chronological message from all the link queues. If one of the link queues is empty, processing in step 112 waits for another block of messages. As each message has a time stamp (added by a probe that picked up the message), each received message is chronologically dated. The oldest message stored in the group of link queues is selected for correlation in step 115. The correlator attempts to find an associated or corresponding call object in the call list to which the oldest message belongs (step 116). If the message is not found in the call list (step 117), a check is made to determine whether the message may be a new call. The check is performed in steps 118, 119 and 121. Step 118 determines whether the message is an IAM (initial address message). If it is not, a single frame CDR is created and sent with the data from the message (step 119). If the message is an IAM, however, a new call object is created in the call list. This process repeats, until one of the link queues is empty. Accordingly, the next oldest message from the group of frame queues is selected (step 115) and the search is made to determine whether this message is a new call or is already in the call list. The repetition of this process is performed by way of decision block 114.

If an associated call is found in the call list (step 117), the selected message is used to transition the state of the call in step 120. The transition of states will be described in detail later. Whether a CDR is generated or not for a message event is determined by step 122. The decision for generating a CDR for a message event will also be described later. Generally, a full CDR or a partial CDR may be generated. A full CDR is generated when the message event is, for example, a release complete having occurred as a result of a RLC message having been received in a link frame queue. Partial CDRs may also be generated during message events prior to a release complete event. For example, an address complete event, occurring as a result of an ACM message having been received in the link frame queue, may generate a partial CDR.

If a CDR is to be generated, the data from a call object in the call list is transferred to create a CDR object (step 123). The CDR is then sent to a host processor, for example. When all the messages that may be received for a call object in the call list have been processed, or determined by decision block 124, the call object is deleted from the call list (step 125).

As discussed, when a block of messages is received (all the messages being from one link), the messages are added to a link frame queue. It will be understood that the size of the block may be a variable depending on the configuration of the probe. The block size depends on the buffer size of the probe and may be, for example, 64 Kbytes. The block size may also depend on a settable timeout in the probe for receiving messages, and may be set to 1 second, for example. Each message in the block is also time stamped by the probe. As the messages are time merged and correlated, it will also be appreciated that the call list in each correlation group may be keyed on various fields in the message. The call list may be keyed on, for example, origination point code (OPC), destination point code (DPC) and trunk ID (TCIC).

Figure 5:
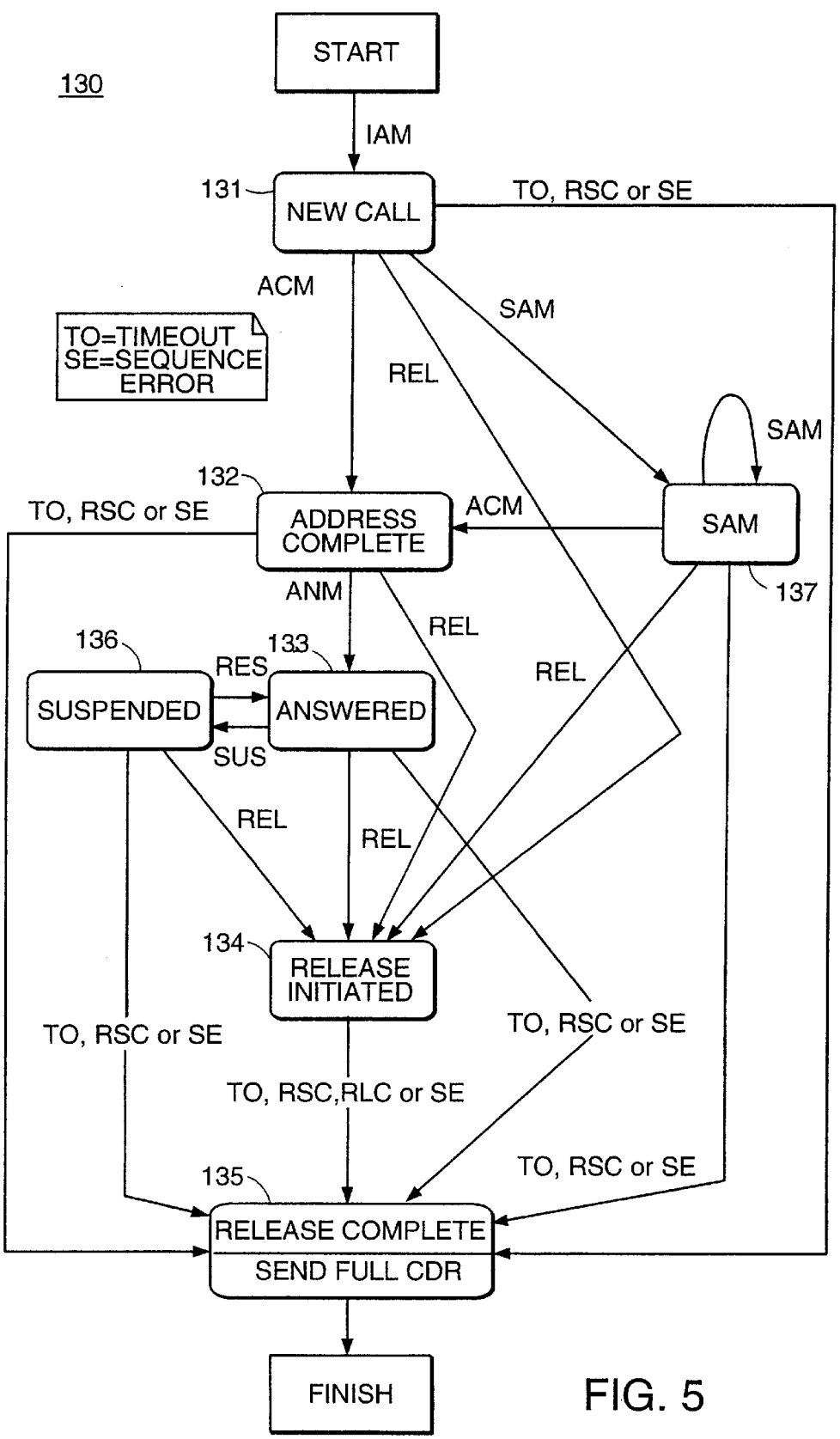
FIG. 5 is a state diagram depicting the generation of a full CDR in the mediator in accordance with the present invention.

The generation of a CDR will now be described by reference to FIGS. 5 and 6, depicting state diagram 130 and 150, respectively, for generating a full CDR and a partial CDR. SS7 messages represent various events during a call.

When an IAM (initial address) is received, new call state 131 in state diagram 130 (new call state 151 in state diagram 150) is entered. In one sequence of events, the address complete (ACM) message is received after the IAM message, thereby entering address complete state 132 in state diagram 130. Following the address complete state, answered state 133 is entered, because answer (ANM) is received. Next, release initiated state 134 and release complete state 135 are sequentially entered in response to REL (release) and RLC (release complete).

All transitions are either due to an SS7 message associated with a call or any of the following conditions: a timeout (TO), a sequence error (SE), reset circuit (RSC), suspend (SUS) and resume (RES). The state names reflect the condition of the call. A sequence error is a message associated with a call that is received out of sequence. For example, it is expected that an ACM message would be received prior to an ANM message. After receiving an IAM, it is possible to receive an ACM, a REL or a SAM (subsequent address). If a SAM is received, SAM state 137 is entered, as shown. Any message from a specific state may only transition to another state, as shown in FIGS. 5 and 6, otherwise a sequence error is considered to have occurred. Although not shown in these figures, the CON (connect) message may substitute for both, the ACM message and the ANM message. The CON message causes a transition to the answered state 133.

A call which uses the full CDR state machine of FIG. 5 generates a full CDR, as shown, after entering the release complete state 135. A call which uses the partial CDR state machine of FIG. 6 generates several CDRs, as desired by the user. As shown in FIG. 6, a setup partial CDR is generated after entering address complete state 152. A single frame CDR is generated after entering answered state 153, and a teardown partial CDR is generated after entering release complete state 155.

The fields of the various CDRs are detailed in the following tables. Table 1 lists the fields in a full CDR. Table 2 lists the fields in a setup partial CDR. Table 3 lists the fields in a teardown partial CDR and Table 4 lists the fields in a single frame CDR. Table 5 lists the variable parameter types that may be included in each of the CDRs. The serial number field (one number) allows the host processor to correlate partial CDR's. This may also be done with OPC/DPC/TCIC.

TABLE 1a

Full CDR

| Field | No. of Octets | Description |
|---|---|---|
| Serial Number | 4 | |
| Correlation Group Id | 1 | |
| Protocol ID | 1 | |
| Network Indicator | 1 | National or International, 14 or 24 Bit |
| Data Length | 2 | |
| Fixed Data | Variable | Depends on Protocol ID Field |
| Optional Data | Variable | See Variable Parameter Types in Table 5 |

TABLE 1b

Fixed Data for Full CDR

| Field | No. of Octets | Description |
|---|---|---|
| OPC | 4 | |
| DPC | 4 | |
| Trunk Id | 2 | |
| Called Party Number | 28 | |
| Calling Party Number | 28 | |
| Calling Party Category | 1 | |
| Carrier Identification | 4 | |

TABLE 1b-continued

Fixed Data for Full CDR

| Field | No. of Octets | Description |
|---|---|---|
| Release Cause Indicator | 2 | |
| Reason | 1 | No Error (0) Timeout (1) Sequence Error (2) Reset Circuit (3) |
| IAM Timestamp | 8 | |
| Monitor Id for IAM | 2 | |
| Link Number for IAM | 1 | |
| ACM Timestamp | 8 | |
| Monitor Id for ACM | 2 | |
| Link Number for ACM | 1 | |
| ANM Timestamp | 8 | |
| Monitor Id for ANM | 2 | |
| Link Number for ANM | 1 | |
| REL Timestamp | 8 | |
| Monitor Id for REL | 2 | |
| Link Number for REL | 1 | |
| RLC Timestamp | 8 | |
| Monitor Id for RLC | 2 | |
| Link Number for RLC | 1 | |

TABLE 2a

Setup Partial (CDR)

| Field | No. of Octets | Description |
|---|---|---|
| Serial Number | 4 | |
| Correlation Group Id | 1 | |
| Protocol ID | 1 | |
| Network Indicator | 1 | National or International, 14 or 24 Bit |
| Data Length | 2 | |
| Fixed Data | Variable | Depends on Protocol ID Field |
| Optional Data | Variable | See Variable Parameter Types in Table 5 |

TABLE 2b

Fixed Data for Setup Partial CDR

| Field | No. of Octets | Description |
|---|---|---|
| OPC | 4 | |
| DPC | 4 | |
| Trunk Id | 2 | |
| Reason | 1 | No Error (0) Timeout (1) Sequence Error (2) Reset Circuit (3) |
| Called Party Number | 28 | |
| Calling Party Number | 28 | |
| Calling Party Category | 1 | |
| Carrier Identification | 4 | |
| IAM Timestamp | 8 | |
| Monitor Id for IAM | 2 | |
| Link Number for IAM | 1 | |
| ACM Timestamp | 8 | |
| Monitor Id for ACM | 2 | |
| Link Number for ACM | 1 | |

TABLE 3a

Teardown Partial CDR

| Field | No. of Octets | Description |
|---|---|---|
| Serial Number | 4 | |
| Correlation Group Id | 1 | |
| Protocol ID | 1 | |
| Network Indicator | 1 | National or International, 14 or 24 Bit |
| Data Length | 2 | |
| Fixed Data | Variable | Depends on Protocol ID Field |
| Optional Data | Variable | See Variable Parameter Types in Table 5 |

TABLE 3b

Fixed Data for Teardown Partial CDR

| Field | No. of Octets | Description |
|---|---|---|
| Reason | 1 | No Error (0) Timeout (1) Sequence Error (2) Reset Circuit (3) |
| Release Cause Indicator | 2 | |
| OPC | 4 | |
| DPC | 4 | |
| Trunk Id | 2 | |
| REL Timestamp | 8 | |
| Monitor Id for REL | 2 | |
| Link Number for REL | 1 | |
| RLC Timestamp | 8 | |
| Monitor Id for RLC | 2 | |
| Link Number for RLC | 1 | |

TABLE 4a

Single Frame CDR

| Field | No. of Octets | Description |
|---|---|---|
| Serial Number | 4 | |
| Correlation Group Id | 1 | |
| Protocol ID | 1 | |
| Network Indicator | 1 | National or International, 14 or 24 Bit |
| Timestamp | 8 | |
| Monitor ID | 2 | |
| Link Number | 1 | |
| Data Length | 2 | |
| Fixed Data | Variable | Depends on Protocol ID Field |
| Optional Data | Variable | See Variable Parameter Types in Table 5 |

TABLE 4b

Fixed Data for Single Frame CDR

| Field | No. of Octets | Description |
|---|---|---|
| Message Type | 1 | IAM = 1 SAM = 2 ACM = 5 ANM = 9 SUS = 13 RES = 14 REL = 12 RLC = 16 RSC = 18 CON = 7 |
| OPC | 4 | |
| DPC | 4 | |

TABLE 4b-continued

Fixed Data for Single Frame CDR

| Field | No. of Octets | Description |
|---|---|---|
| Trunk Id | 2 | |
| Called Party Digits | 28 | |
| Release Cause Indicator | 2 | |

TABLE 5a

Variable Parameter Types

| Name | Encoding |
|---|---|
| Event | Event Parameter Structure (Timestamp; 8 octets) |
| Charge Number | Digit Parameter Structure |
| Generic Address (GAP) | Digit Parameter Structure |
| Generic Digits | Digit Parameter Structure |
| Redirecting Number | Digit Parameter Structure |
| Redirection Number | Digit Parameter Structure |
| Original Called Number | Digit Parameter Structure |
| Connected Number | Digit Parameter Structure |
| Location Number | Digit Parameter Structure |
| Redirection Information | Redirection Information Structure (See Table 5b) |

TABLE 5b

Redirection Information Structure

| | | |
|---|---|---|
| Redirection Type | 1 octet | See below |
| Redirection Reason | 1 octet | See below |
| Redirection Count | 1 octet | Number of redirection this call has undergone |
| Original Redirection Reason | 1 octet | Same encoding as Redirection Reason. Not valid unless Redirection count is 2 or more |

TABLE 5c

Redirection Type

| | |
|---|---|
| No Redirection | 0 |
| Call Rerouted | 1 |
| Call Diversion | 2 |

TABLE 5d

Redirection Reason

| | |
|---|---|
| Unknown | 0 |
| User Busy | 1 |
| No Reply | 2 |
| Unconditional | 3 |
| Deflection | 4 |
| Mobile Subscriber not Reachable | 5 |

What is claimed:

1. In a telephone network having a plurality of signaling service points (SSPs) communicating message signaling unit (MSU) data with a plurality of signal transfer points (STPs), the MSU data routed on data links connecting the plurality of SSPs and STPs, a mediation system comprising:

a probe connected to at least a first one of the data links associated with a first one of the plural SSPs for intercepting first MSU data routed on the at least first one data link, and connected to at least a second one of the data links associated with a second one of the plural SSPs for intercepting second MSU data routed on the at least second one data link, and a first mediator coupled to the probe for collecting the first MSU data and generating a first call detail record (CDR); and a second mediator coupled to the probe for collecting the second MSU data and generating a second CDR.

2. In a telephone network having a plurality of signaling service points (SSPs) communicating message signaling unit (MSU) data with a plurality of signal transfer points (STPs), the MSU data routed on data links connecting the plurality of SSPs and STPs, a mediation method comprising the steps of:

coupling a probe to a least a first one of the data links between a first one of the plurality of SSPs and one of the plurality of STPs and to at least a second one of the data links between a second one of the plurality of SSPs and one of the plurality of STPs;

intercepting first MSU data routed on the at least first one of the data links and second MSU data routed on the at least second one of the data links;

transmitting the first intercepted MSU data to a first mediation device;

transmitting the second intercepted MSU data to a second mediation device;

generating a first CDR from the first MSU data at the first mediation device; and generating a second CDR from the second MSU data at the second mediation device.

* * * * *